United States Patent

[11] 3,625,994

[72] Inventors Herbert Eck;
 Hellmuth Spes, both of Burghausen, Upper Bavaria, Germany
[21] Appl. No. 654,354
[22] Filed July 19, 1967
[45] Patented Dec. 7, 1971
[73] Assignee Wacker-Chemie G.m.b.H.
 Bavaria, Germany
[32] Priority July 22, 1966
[33] Germany
[31] W 42065

[54] PROCESS FOR MAKING POLYESTERS CONTAINING ETHER GROUPS
 5 Claims, No Drawings

[52] U.S. Cl. .................................................. 260/484 R,
 260/31.4 R, 260/468 R, 260/473 R, 260/535 R
[51] Int. Cl. ..................................................... C07c 69/66
[50] Field of Search ............................................ 260/484, 468

[56] References Cited
 FOREIGN PATENTS
 716,071  8/1965  Canada .................... 260/484

*Primary Examiner*—Lewis Gotts
*Assistant Examiner*—Paul J. Killos
*Attorney*—Donald Malcolm ABSTRACT: This invention relates to the manufacture of polyesters containing ether groups, and it has for its object to provide a novel and improved process for this purpose.

PROCESS FOR MAKING POLYESTERS CONTAINING ETHER GROUPS

SUMMARY OF THE INVENTION

We have now discovered a process for making polyesters, containing ether groups, of the general structure: $-O-(CR_2)_{2-5}-O-CHR'-CR''_2-CO-$ In this formula $R=H$, halogen, saturated or unsaturated, branched or unbranched, in a given case substituted alkyl residues, and a C—C-double bond can also exist in the principal chain, substituted or unsubstituted mono- or divalent alicyclic, aromatic or heterocyclic residues, where in case of the equality of all residues R cannot be greater than $C_2H_5$ is. $R'=H$, saturated or unsaturated, branched or unbranched, in a given case substituted aliphatic residue, substituted or unsubstituted alicyclic, aromatic or heterocyclic residue; and $R''=H$ or alkyl.

The process is characterized by the fact that we react cyclic acetals of the general structure

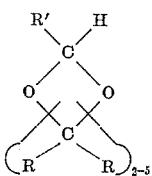

with ketenes of the general formula $CH_2=C=O$, where R and R' have the meaning indicated above and do not react alkaline, in the presence of an acid catalyst at temperatures between $-80°$ and $160°$ C. if required in the presence of a solvent.

As acid catalysts, among those suitable are mineral acids, e.g. sulfuric acid, phosphoric acid, difluorophosphoric acid hexafluorophosphoric, and/or Friedel-Crafts catalysts, e.g. boron trifluoride etherate, aluminum chloride, zinc chloride and ferric (III) chloride. A catalyst concentration of 0.05 percent, referred to the cyclic acetal used, is sufficient. The upper limit depends on economic factors and generally will not be more than 5 percent. Usually a catalyst concentration within the range of 0.2–2 percent is sufficient.

If one wishes to work in a solution, all indifferent solvents like ether, chlorinated hydrocarbons like methylene chloride and trichlorethylene, dimethyl formamide, hydrocarbons like toluol, cyclohexane and benzene are suitable. The method is limited to 5 to 8-member cyclic acetals which contain both acetal oxygens in the ring and which do not show any second acetal function in the same ring. When using bicyclic acetals with one acetal group per each ring, highly branched ether groups containing polyesters are formed. If one uses mixtures of such polyacetals and monoacetals, the results are ether group-containing polyesters with corresponding degrees of branching. It is surprising that the cyclic acetals used react so smoothly with ketene, since they are more stable and thus slower to react than noncyclic acetals. Moreover, one could not have expected that the reaction would lead to the formation of ether group-containing polyesters, because cyclic acetals by no means always react analogously with the open acetals. The same applies even more strongly to ketene which, as is known, yields various products, depending on the catalyst and reaction conditions used.

The resulting ether group-containing polyesters can be used as softeners, for instance for polyvinyl chloride.

If the ether group-containing polyesters are hydrolyzed, the resulting hydroxy ether carboxylic acids are suitable for instance, for initial raw materials for emulsifiers which can be used, for instance, for making polyvinyl chloride emulsions. In this manner it is also possible to obtain ether group-containing polyesters with terminal primary hydroxyl groups.

DESCRIPTION OF THE PREFERRED EMBODIMENTS

EXAMPLE 1

Into a mixture of 176 g. 2-methyl-1,3-dioxolane and 4.5 ml. boron trifluoride di-etherate, 78 g. of ketene was introduced over a period of 1.5 hours. The temperature of the reaction mixture quickly rose to 40° C. This temperature was maintained by cooling. The resulting deep red reaction product (yield 97 percent was neutralized with an aqueous sodium acetate solution, compounded with a 1.5 times greater volume of ether, rinsed with water, freed of the ether and heated for 2 hours in a water jet vacuum to 160° C. In this manner it was possible to obtain the analysis-pure polyester in a 68 percent yield (referred to the ketene used) in the form of a red oil which shows the following physical properties:

| | | |
|---|---|---|
| Viscosity (20° C.): | | 320 cP |
| Molecular weight: | | 465 |
| Hydroxyl number: | | 4.2 |
| Carboxyl number: | | 2.7 |
| Analysis: | found (%): | computed (%): |
| | C 55.47 | 55.38 |
| | H 7.60 | 7.69 |

EXAMPLE 2

Into a mixture of 229 g. of 4-methyl-1,3-dioxane and 4.5 ml. of boron trifluoride etherate, 45 g. of ketene at 0° C. were introduced over a period of 1.5 hours. The processing of the reaction product was done in the same manner as in example 1. The resulting analysis-pure polyester was a light yellow oil. Yield: 77 percent (referred to the ketene used). The physical properties of the polyester are:

| | | |
|---|---|---|
| Viscosity (20° C.): | | 94700 cP |
| Molecular weight: | | 1420 |
| Hydroxyl number: | | 0.5 |
| Carboxyl number: | | 1.0 |
| Analysis: | found (%): | computed (%): |
| | C 58.43 | 58.33 |
| | H 8.29 | 8.33 |

Practically the same result was achieved when using 0.2 percent hexafluorophosphoric acid as a catalyst.

EXAMPLE 3

Into a mixture of 232 g. of 5,5-dimethyl-1,3-dioxane and 4.5 ml. boron trifluoride di-etherate, 84 g. of ketene were introduced at 20–40° C. The processing was done in the same manner as in example 1. The analysis-pure polyester was obtained in a 73 percent yield (referred to the ketene used) as an orange-colored oil with the following physical properties:

| | | |
|---|---|---|
| Viscosity (20° C.): | | 115000 cP |
| Molecular weight: | | 1470 |
| Hydroxyl number: | | 6.6 |
| Carboxyl number: | | 3.9 |
| Analysis: | found (%): | computed (%): |
| | C 61.05 | 60.76 |
| | H 8.62 | 8.86 |

EXAMPLE 4

Into a solution of 76 g. 1,3-dioxepane and 1 g. hexafluorophosphoric acid in 150 ml. ether, 28 g. ketene were introduced at $-10°$ to 0° C. over a period of 40 minutes. As in the preceding examples the ether solution was neutralized with sodium acetate and by repeated rinsing with water it was freed of salts and low-molecular impurities. After a 2-hour treatment at 160° C. in the water jet vacuum a light yellowish polyester was obtained in an 85 percent yield (referred to the ketene used) with the following physical properties:

| | |
|---|---|
| Viscosity (20° C.): | 1450 cP |
| Molecular weight: | 1420 |
| Hydroxyl number: | 0.5 |
| Carboxyl number: | 3.5 |

Analysis:
| | found (%): | computed (%): |
|---|---|---|
| C | 58.37 | 58.33 |
| H | 8.93 | 8.33 |

EXAMPLE 5

Into a solution of 58 g. 2-phenyl-5,5-dimethyl-1,3-dioxane and 0.5 g. hexafluorophosphoric acid in 150 ml. dry benzene, 12 g. ketene were introduced at 5° C. The processing was done in the same manner as in example 1. However, before removing the ether it was necessary to withdraw the benzene because the layer separation would otherwise have occurred too slowly.

The result was an orange-red-colored tough, clear resin with a molecular weight of 1700. Yield of the analysis-pure polyester: 85 percent (referred to the ketene used).

Analysis:
| | found (%): | computed (%): |
|---|---|---|
| C | 72.16 | 71.79 |
| H | 7.67 | 7.69 |

A solution of 1450 g. 4-methyl-1,3-dioxane and 40 ml. boron trifluoride di-etherate in 1410 g. methylene chloride was pumped into a reactor, into which ketene was introduced at the same time. The input speed was 200 ml./hour. This is equal to a starting period of about 60 min. The molar proportion of 4-methyl-1,3-dioxane to ketene was 1 : 0.95. Reaction temperature: 25°–35° C.

The reaction product was freed of the catalyst by means of an ion exchanger and was obtained after withdrawal of the solvent and the low molecular components at 120° C. in the vacuum as a yellow oil.

Analysis:
| | found (%): | computed (%): |
|---|---|---|
| C | 58.61 | 58.33 |
| H | 8.19 | 8.33 |

Hydroxyl number: 1.5
Carboxyl number: 3.6

EXAMPLE 7

A solution of 470 g. 1,3-dioxepane and 5 ml. hexafluorophosphoric acid in 1800 g. methylene chloride was continuously reacted with ketene, as in example 6. Staying period: about 20 min; reaction temperature: −5° to 0° C. Mol proportion of 1,3-dioxepane : ketene = 1 : 1.

The processing was done as in example 6. The resulting polyester had the same appearance and physical properties as the one described in example 3.

The invention claimed is:

1. Process for making ether-group-containing polyesters of the general structure —O—$(CR_2)_{2\text{–}5}$—O—CHR'—$CH_2$—CO—, where R =H, $CH_3$; and R' =H, $CH_3$, phenyl, characterized by the fact that cyclic acetals with the general structure

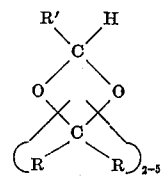

are reacted with ketene of the formula $(H_2)_2$ C =C =O, where R and R' have the meaning defined above and do not have an alkaline reaction in the presence of an acid catalyst, at a temperature between −80° and 160° C.

2. Process according to claim 1, characterized by the fact that the acid catalyst is selected from the group consisting of mineral acids and Friedel-Crafts catalysts.

3. Process according to claim 1, characterized by the fact that the acid catalyst is selected from the group consisting of mineral acids and Friedel-Crafts catalysts which are used in a concentration within the range of 0.05—5 percent referred to the cyclic acetal used.

4. Process according to claim 1, characterized by the fact that the acid catalyst is selected from the group consisting of mineral acids and Friedel-Crafts catalysts which are used in a concentration within the range of 0.2—2 percent referred to the cyclic acetal used.

5. Process according to claim 1, characterized by the fact that the reaction is carried out in a solution of indifferent solvents selected from the group consisting of ether, chlorinated hydrocarbons, dimethyl formamide, hydrocarbons.

* * * * *